United States Patent [19]

Anderson et al.

[11] Patent Number: 4,653,048

[45] Date of Patent: Mar. 24, 1987

[54] METHOD FOR INTERPROCESSOR MESSAGE ACCOUNTABILITY

[75] Inventors: Lewis G. Anderson, West Chicago, Ill.; Wen Ku, Naperville, N.J.

[73] Assignee: American Telephone and Telegraph Company, Murray Hill, N.J.

[21] Appl. No.: 609,826

[22] Filed: May 14, 1984

[51] Int. Cl.$^4$ .................. H04J 3/24; G06F 15/00
[52] U.S. Cl. .................. 370/94; 364/200; 371/47; 371/72
[58] Field of Search ... 364/200 MS File, 900 MS File, 364/300; 371/32, 72, 47; 370/94

[56] References Cited

U.S. PATENT DOCUMENTS

| | | | |
|---|---|---|---|
| 4,398,290 | 8/1983 | Mathieu et al. | 370/94 |
| 4,439,859 | 3/1984 | Donnan | 371/32 |
| 4,519,068 | 5/1985 | Krebs et al. | 370/82 |
| 4,530,051 | 7/1985 | Johnson et al. | 364/200 |
| 4,551,834 | 11/1985 | Liénard | 370/94 |
| 4,564,900 | 1/1986 | Smitt | 364/200 |

Primary Examiner—Archie E. Williams
Assistant Examiner—Thomas C. Lee
Attorney, Agent, or Firm—Charles H. Davis; Richard J. Godlewski

[57] ABSTRACT

A method and apparatus are used for accounting for last and out-of-sequence interprocessor messages in a multi-processor telephone switching system. Each message is assigned a sequence number by the sending processor. Upon reception of messages, the receiving processor analyzes the sequence numbers to ascertain their proper order and if any messages are missing. The identities of missing messages are entered in a table which is periodically updated.

14 Claims, 7 Drawing Figures

FIG. 1

FIG. 2
SEQUENCE NUMBER TABLE

| PROCESSOR I.D. | LOGICAL LINK | MS | SC | MR | RC |
|---|---|---|---|---|---|
| CONTROL UNIT 1 | | | | | |
| CONTROL UNIT 2 | | | | | |
| ⋮ | ⋮ | ⋮ | ⋮ | ⋮ | ⋮ |
| CENTRAL CONTROL | | | | | |

FIG. 3
OUT-OF-SEQUENCE MESSAGE TABLE

| SENDING PROCESSOR I.D. | LOGICAL LINK | MSG. SEQ. NO. | ENTRY TIME |
|---|---|---|---|
| CONTROL UNIT 1 | | | |
| CONTROL UNIT 2 | | | |
| ⋮ | ⋮ | ⋮ | ⋮ |
| CENTRAL CONTROL | | | |

FIG. 7  TABLE I

| CASE | SEQUENCE NO. | | VARIABLES | | | $d_{min}$ | POSITION OF MR new |
|---|---|---|---|---|---|---|---|
| | MR old | MR new | dn | dna | dnc | | |
| A | 5 | 6 | – | – | – | 1 | ADJACENT |
| B | 1 | 5 | 260 | 4 | – | 4 | AHEAD |
| C | 254 | 3 | 5 | – | – | 5 | AHEAD |
| D | 5 | 1 | 252 | – | 4 | 4 | BEHIND |
| E | 3 | 254 | 507 | 251 | 5 | 5 | BEHIND |
| F | 100 | 150 | 306 | 50 | 206 | 50 | OUTSIDE D |

METHOD FOR INTERPROCESSOR MESSAGE ACCOUNTABILITY

TECHNICAL FIELD

This invention relates to communication systems and particularly to error detecting arrangements.

In a more particular aspect, this invention relates to arrangements for detecting errors in the transmission of data in a multiprocessor system.

In a still more particular aspect, this invention relates to arrangements for detecting errors in the transmission of messages between processors where the messages are transmitted over a plurality of transmission links.

BACKGROUND OF THE INVENTION

In a multiprocessor communication system, messages are sent over data links between processors and certain protocols have been established to specify the procedure for exchanging information between two ends of a single communication link. While these protocols provide sufficient protection against transmission errors for a single link connection, problems still exist in a multilink environment.

For example, messages can get lost along a communication path made up of a plurality of serially connected links in places such as message buffers, queues, etc., associated with the intermediate and end processors.

Additionally, when duplicate parallel links are provided for reliability, portions of a sequence of messages associated with a single process may be sent via different paths to the same destination. In many instances, these messages must be acted upon in the same sequence in which they were transmitted; however, due to the multiple paths available, the messages may not arrive in the same order in which they were transmitted and some messages may even be lost.

Thus, a need exists for detecting lost or out-of-sequence messages in a multiprocessor enviroment.

The problem of lost or out-of-sequence messages has been considered in the past. In one known arrangement, for example, each message is assigned a sequence number by the sending procssor. The receiving processor then keeps track of the sequence numbers. It may acknowledge the receipt of each message and in some instances request retransmission of any lost or garbled messages.

While the above arrangement is suitable for its intended purpose, whenever the retransmission of lost messages is provided, additional storage is required since the sending processor must keep a record of all messages that are sent until each message is acknowledged by the receiver. Also, in a large multiprocessor system, the average message interarrival time between two end processors may be lengthy during busy periods. The receiving processor may erroneously interpret the length of time between messages as a lost message and prematurely ask for retransmission, thus unnecessarily increasing the message flow between processors.

SUMMARY OF THE INVENTION

The foregoing and other problems are solved, and a technical advance is achieved by method and apparatus for detecting lost or out-of-sequence messages in a multiprocessor environment.

More specifically and in accordance with the illustrative embodiment of the invention, consecutive sequence numbers which are selected from a finite modulus are assigned to messages transmitted from the sending processor. At the receiving processor, the distance between nonconsecutive incoming modular sequence numbers is evaluated. If the distance between adjacently received sequence numbers exceeds 1, a determination is made as to whether any messages are missing and whether the adjacent messages were received in the reverse order from which they were sent.

More specifically, a pseudowindow is defined and denotes an empirical possible range for out-of-sequence and missing messages to occur. The distances between the two adjacent modular sequence numbers is ascertained at the receiving processor. The larger distance is discarded and the smaller distance is compared to the pseudowindow. If the smaller distance falls within the window, a determination is made as to the correct order of the messages, and a record is kept of any missing messages. The record is continually updated upon the late arrival of missing messages.

DETAILED DESCRIPTION

The invention is useful in a multiprocessor environment such as a telephone switching system having distributed processors. One example of such a system is disclosed in U.S. Pat. No. 4,322,843 issued to H. J. Beuscher et al., on Mar. 30, 1982. While a detailed description of the Beuscher et al. system is not necessary for a complete understanding of the present invention, a brief description of that system will now be give in order for the reader to appreciate the environment in which the present invention is applicable.

Figure 1:
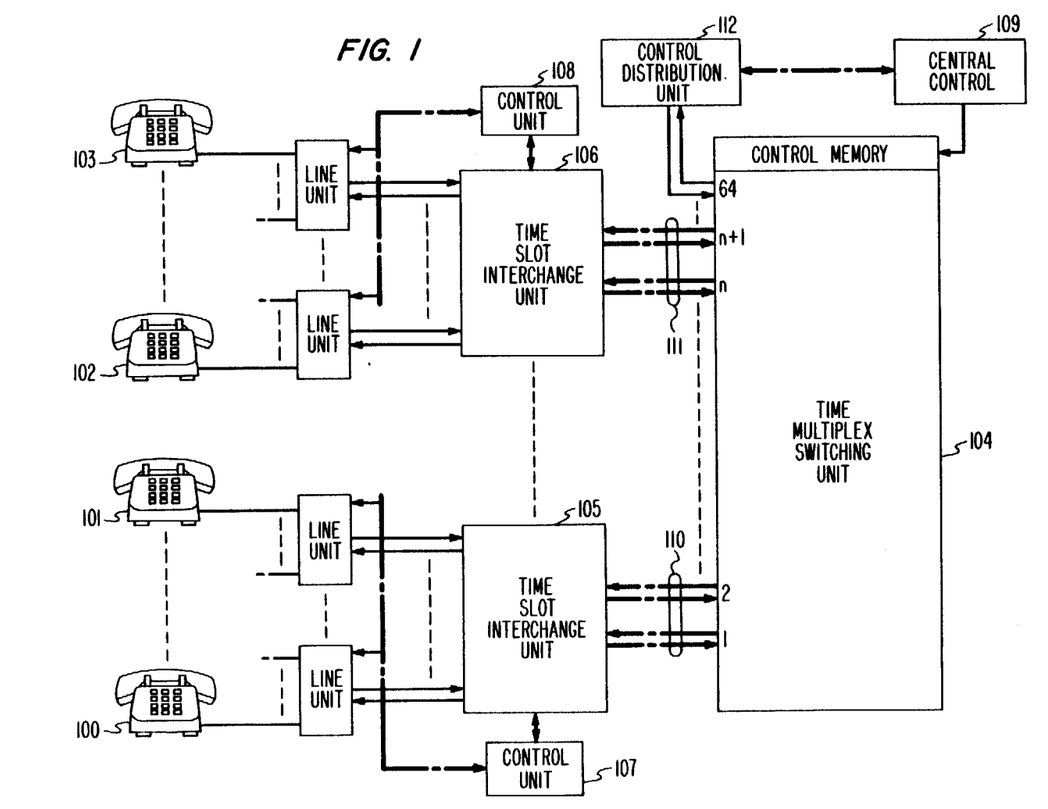
FIG. 1 shows a block diagram of a multiprocessor telephone switching system utilizing the invention.

FIG. 1 shows a portion of the Beuscher et al. disclosure and is a block diagram of a time division switching system for interconnecting a plurality of customer stations 100–103. The system includes a time multiplex switching unit 104 and a plurality of time slot interchange units such as 105 and 106 which are coupled to the time multiplex switching unit via a pair of input-/ouput ports.

Each time slot interchange unit is uniquely associated with a control unit and each control unit contains a processor, memory, interface circuitry, etc., for controlling its associated time slot interchange unit.

The processor designated central control 109, which performs certain administrative functions for the switching system, exchanges control messages with the control units 107 and 108 utilizing selected control channels, such as 110 and 111, between the time multiplex switching unit and the appropriate time slot interchange unit 105 and 106.

Control units 107 and 108 can communicate with each other by sending control messages on their control channels 110 and 111 respectively, to the time multiplex switch unit 104. The processor designated control distribution unit 112 interprets the destination portion of these messages and retransmits the message to the time multiplex switching unit in the appropriate time slot associated with the destination control unit.

Thus, it can be seen from the above description that in order to perform the many functions necessary for providing telephone service to the customer stations, the processors in the control units, the control distribution unit and the central control must all communicate with each other over data links which are provided in duplicate for reliability. In addition to the buffers, queues, etc., that are provided at each processor stage, a message between a transmitting processor in one control unit and a receiving processor in another control unit, may traverse a plurality of serially related links. As a consequence, messages can get delayed or lost along the way because of queue overloads. Furthermore, portions of a series of messages may be transmitted via different paths as duplicate links are switched into and out of service to compensate for equipment irregularities. Thus, messages may not arrive at the receiving processor in the same sequence that they were transmitted.

In accordance with the present invention, sequence numbers are assigned to each message transmitted by the sending processor, and these numbers are analyzed by the receiving processor to ascertain if any numbers are missing or if the numbers are not in the correct order.

In the example being described, the sequence numbers are selected from a finite modulus N. While N can be any positive integer, the quantity 256 had been selected since sequence numbers selected within this range can be represented by an 8-bit byte in the message that is transmitted.

In a modulo sequence numbering system, the order of any two numbers is not apparent from their absolute value and there is no immediate way to decide their precedence since the series of numbers is continuously repeated. For instance, with a modulus of 256 a series of sequence numbers would run 0, 1, 2, 3, ..., 255, 0, 2, 3, ..., 255, ... etc. If the sequence numbers 2 and 1 were appended to adjacent messages that were received by a processor where the message numbered 2 was received before the message numbered 1, the processor would not know by merely examining the numbers whether these numbers were consecutive and had been received in the reverse order or whether the messages were actually received in the correct order, but those messages numbered 3, 4, ... 225 and 0 were missing.

In order to ascertain the proper sequence of the received messages, two distances "dmin" and "dmax" are defined as the distances between two adjacent modulo sequence numbers that are received at a receiving processor. In the example described above, these distances would be 1 and 255 respectively.

Furthermore, and in accordance with our invention, a pseudowindow is defined and designated D. The window D denotes the empirical possible range for an out-of-sequence or missing message to occur. In this illustrative embodiment, the value of D is assumed to be 10.

Thus, in the above example where "dmin"=1 and "dmax"=255, "dmax" exceeds the window D and is assumed to be the invalid distance between the sequence numbers. This value "dmax" is discarded and the value "dmin" is considered the "true" distance. A conclusion can then be drawn that the sequence numbers were received in the reverse order from which they were sent.

Figure 2:
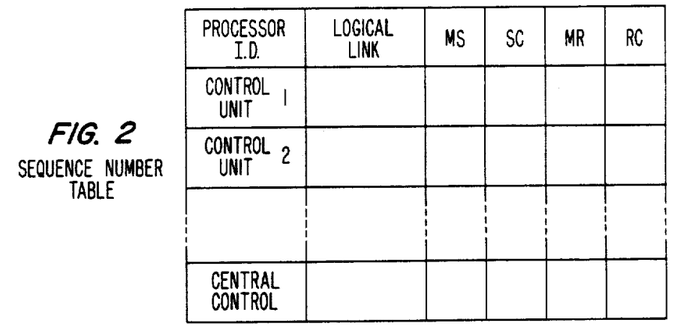
FIGS. 2 and 3 are pictorial representations of the memory associated with one of the processors of the switching system of FIG. 1.

In order to keep track of messages sent and received, each processor has a SEQUENCE NUMBER table in its memory. A pictorial representation of typical SEQUENCE NUMBER table associated with control unit 107 is shown in FIG. 2. It should be noted that the table contains an entry for each of the other processors that control unit 107 can communicate with and the identity of the link that was used for the last message sent to or received from that processor. In addition to the identity of the link used for a message, the sequence number of the last message sent (MS) and the sequence number of the last message received (MR) is also recorded on the table. Furthermore, a total count of the number of messages sent (SC) and the number of messages received (RC) is kept for each processor.

Figure 3:
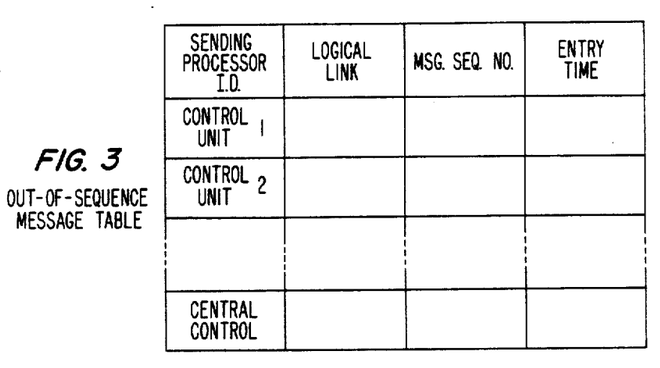

In addition to the SEQUENCE NUMBER table the memory for each processor contains an OUT-OF-SEQUENCE MESSAGE table such as a table pictorial represented in FIG. 3. The sequence number of all messages that are out-of-sequence are recorded in the table along with their entry times. If any message arrives within a predetermined time after its entry on the OUT-OF-SEQUENCE table, it will be removed from the table. Otherwise it will be marked as a missing message.

Thus, in accordance with the general principals of operation of the arrangement, when a processor receives adjacent messages bearing consecutive sequence numbers, the SEQUENCE NUMBER table is updated upon receipt of each message. Should a processor receive adjacent messages whose sequence numbers are not consecutive, the processor first determines the minimum distance between the two numbers. If the minimum distance, "dmin", is within window D the largest distance, "dmax", is disregarded. The processor then determines the proper order for the two sequence numbers. In situations where the sequence numbers are in the correct order but not consecutive, the processors list the numbers of all the missing messages on the OUT-OF-SEQUENCE MESSAGE table shown in FIG. 3.

Should the processor find that nonconsecutive sequence numbers are in fact not in the proper order, the processor consults the OUT-OF-SEQUENCE MESSAGE table in order to ascertain if the most recently received sequence number has previously been reported as a missing number.

While in most instances the minimum distances between the adjacently received sequence numbers falls within the window D it is possible that a newly received sequence number can be so far apart from the last received sequence number to fall outside the window. In this case the processor first examines the OUT-OF-SEQUENCE MESSAGE table to determine if the message has previously been reported as missing. If the sequence number does not appear in the OUT-OF-SEQUENCE MESSAGE table the processors assumes this might be a "wild" jump ahead, and the sequence number is put in a table designated TEMP (not shown) for further observation. Thus, the long list of sequence numbers apparently missing between the last one received and the sequence number currently being processed is not recorded at this time. Should the next sequence number that is received be in the same vicinity as the one on the TEMP table the processor considers this a valid jump ahead and goes back and lists all of the intervening sequence numbers as missing messages.

If, however, the next sequence number of the message is within the vicinity of the previously recorded sequence number and not the sequence number listed in the TEMP table, the sequence number in the TEMP table is marked as out of order and an error report is made.

In order for the reader to understand the principle of the operation of the system a few examples of the possible sequence number ordering conditions that can exist will be described, followed by the description of the operation of a processor in performing functions necessary to detect lost or OUT OF SEQUENCE MESSAGES.

Figure 7:
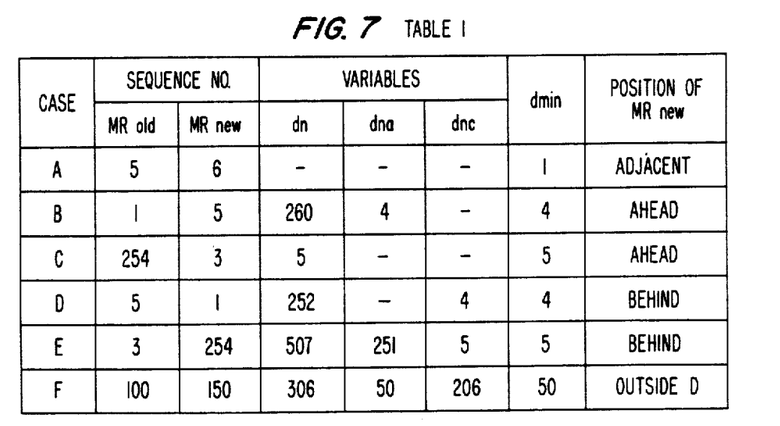
FIG. 7 is a table of several examples of how sequence numbers are processed to account for lost messages and messages which are not in the proper order.

Table 1 in FIG. 7 depicts six examples of how sequence numbers might be received by a processor.

For Case A shown in the table the new sequence number, MRnew, is consecutive to the last sequence number, MRold, that was received and the processor merely updates the sequence number table.

For Cases B and C the minimum distances (dmin) between the old and new sequence numbers MRold and MRnew, are within the window D and the numbers were received in the proper order, but there are several sequence numbers, and the messages associated therewith, that are missing.

Cases D and E illustrate situations where the minimum distances between adjacently received sequence numbers are within the window D but the numbers were not received in the proper order.

Case F in Table 1 illustrates a situation where both distances between adjacently received sequence numbers are greater than the window D. As noted above, the processor will not list all intervening messages as missing until it is sure that the new sequence number is not just a wild jump ahead.

Figure 4:
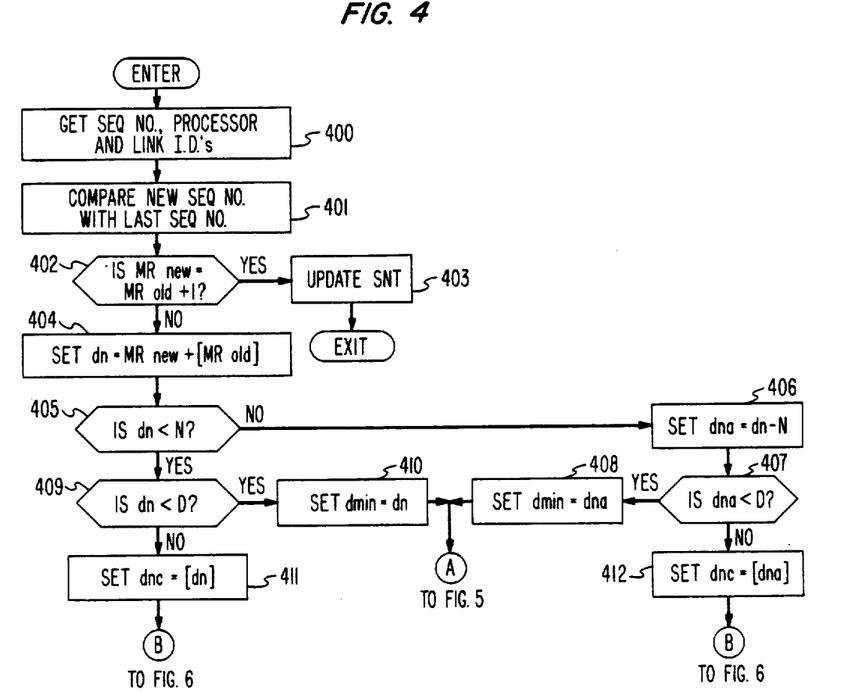
FIGS. 4-6 are flow diagrams of the sequence of operations executed by the processor in accordance with the invention.
Figure 5:
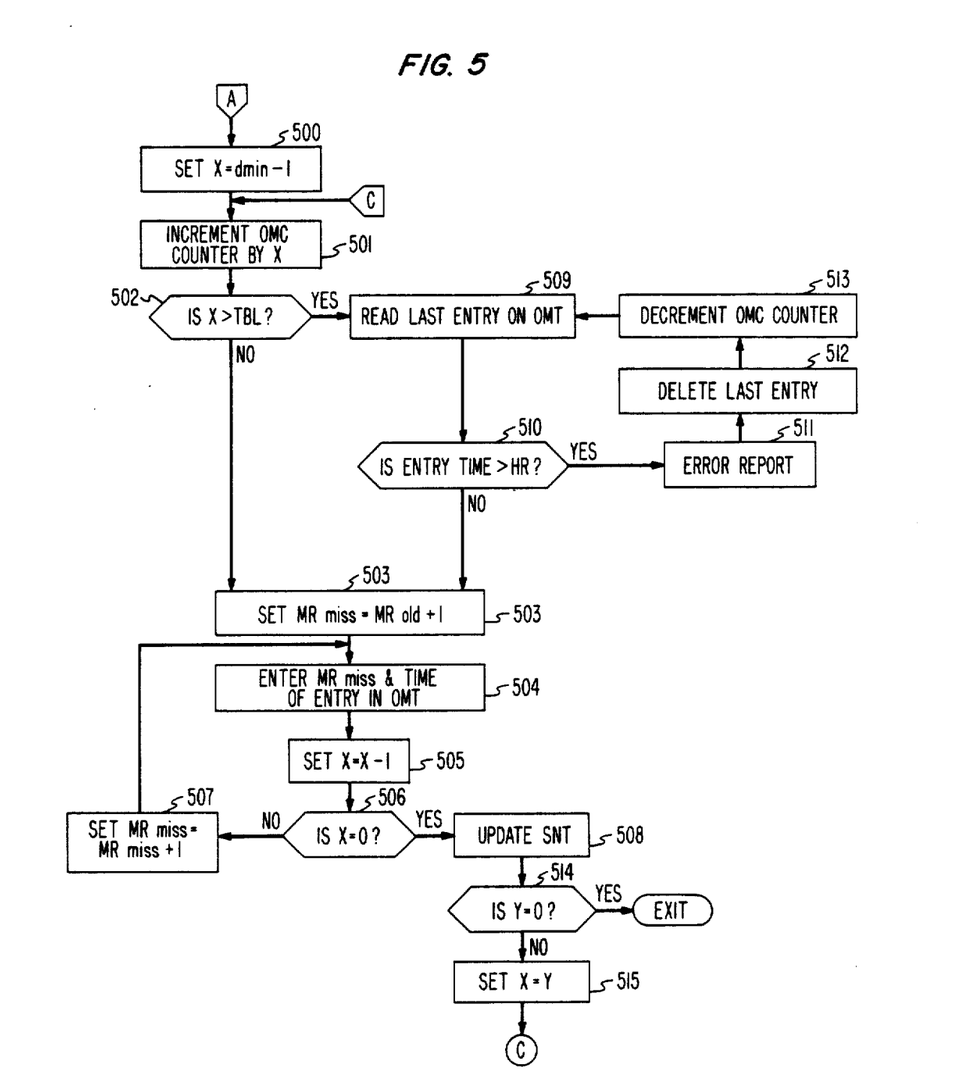
Figure 6:
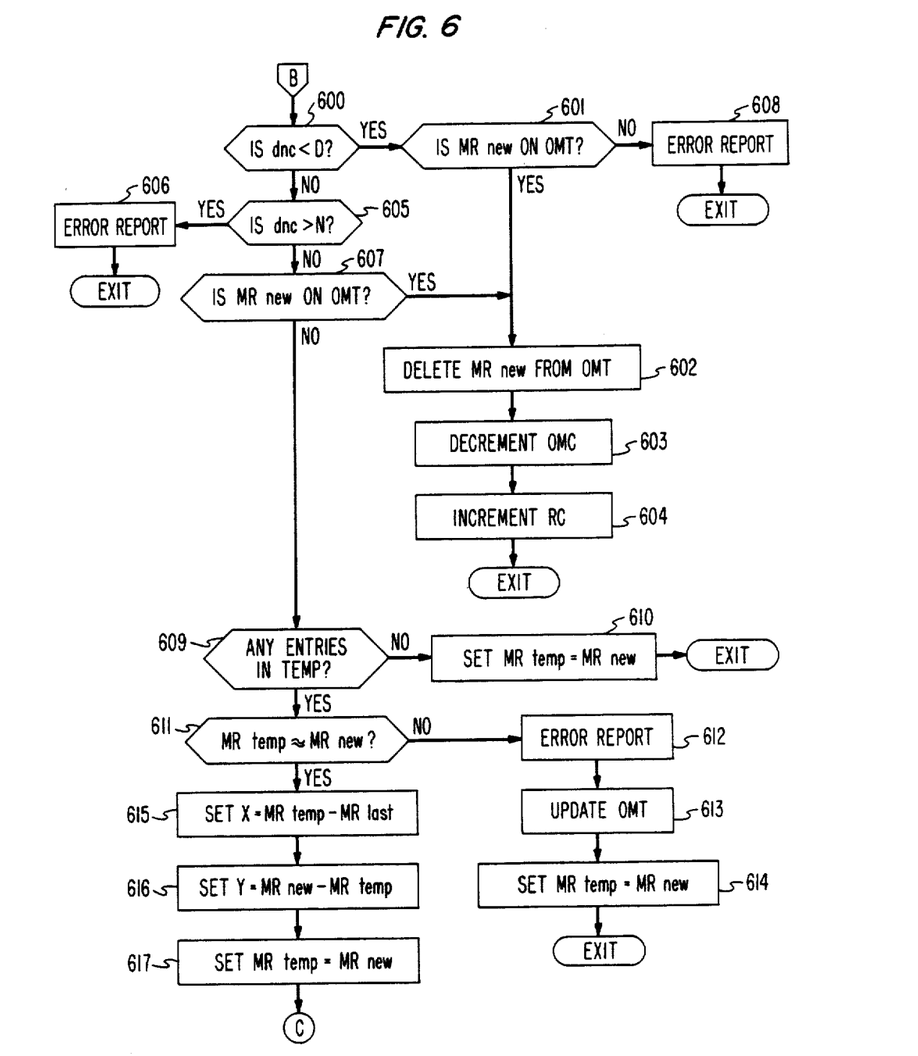

The flowcharts shown in FIGS. 4-6 depict the sequence of operations a processor, such as processor 107, performs in implementing the invention.

To illustrate how the system works under different circumstances it will be assumed that the sequence numbers arrive at the processor in the manner shown in each of the Cases A through F depicted in Table 1.

In all cases, as each message arrives the receiving processor obtains the sequence number, the sending processor's identification and identification of the link over which the message was received, as shown in Box 400. The new sequence number MRnew, is then compared with the last sequence number MRold (Box 401). If the new number is the next consecutive number as in Case A, the "yes" branch of Box 402 is executed and the operation in Box 403 is performed to update the SEQUENCE NUMBER table. The table is updated by incrementing the messages received counter RC and changing the sequence number of MRold to the new sequence number that was assigned to the message being processed at this time. The processor then exits this portion of the program until another message is received.

Let it now be assumed that a Case B (Table 1) situation takes place, namely, that the last message received was numbered 1 (MRold=1) and the sequence number of the message now being processed is 5 (MRnew=5). The "no" branch of Box 402 is executed indicating that the sequence numbers are not consecutive and a variable "dn" is generated (Box 404) by adding the N's complement value of MRold (i.e., [MRold]) to the value of MRnew. The N's compliment of a value, such as MRold, is generated by subtracting MRold from N (where N is the modulo number 256 in this embodiment). Since the resulting value (260) is larger than N, the "no" branch of Box 405 is executed and another variable "dna" is generated by subtracting N from "dn" as set forth in Box 406.

Decision Box 407 is now executed to determine if the value of "dna" is less than the pseudowindow D. In this example, Case B, the value of "dna" is 4, so the "yes" branch of Box 407 is executed and processor 107 sets the variable "dmin" equal to the value of "dna". The variable "dmin" represents the minimum distance between MRold and MRnew.

Up to this point in the sequence of operation with respect to a Case B situation, the processor has determined that MRnew is ahead of MRold and that some intervening messages are missing, but not necessarily lost.

The processor continues in accordance with the flowchart shown in FIG. 5 and will enter the sequence numbers that are missing between MRold and MRnew.

Box 500 is executed to compute the temporary variable "x" which represents the number of missing messages and the out-of-sequence message counter OMC is incremented by "x" (Box 501) to keep track of the total number of missing messages. The number of missing messages is then compared to a constant TBL as shown in Box 502.

If the number of missing messages exceeds the threshold TBL, the processor will examine the OUT-OF-SEQUENCE MESSAGE table (Box 509) and delete any entries that have been on the table in excess of a predetermined time interval defined by the constant "HR". The messages are deleted from the OUT-OF-SEQUENCE MESSAGE table on the asssumption that if they have not arrived within the prescribed time, they are lost. This sequence of events is described in Boxes 509-513.

Let it be assumed that the "no" branch of Box 502 is executed indicating that less than the threshold value TBL of messages are missing. The processor now establishes a value MRmiss by incrementing the sequence number of the last message received, MRold. MRmiss is now entered in the OUT-OF-SEQUENCE MESSAGE table along with the time of entry (Box 504) and the variable "x" is decrmented by 1. If there are additional messages to be recorded (i.e., if "x" is not equal to zero), the variable MRmiss is incremented and the other missing messages are listed on the OUT-OF-SEQUENCE MESSAGE table. This process involving the operations described in Boxes 504-507 continues until all missing messages have been listed on the table. The SEQUENCE NUMBER table is now updated (Box 508) by changing the MRold entry to the sequence number of the message currently being processed (MRnew). A check is now made of the variable "y", since y=0 in this case, the yes branch of Box 514 is executed, and this portion of the program is exited waiting for the next message to arrive. The function of the variable "y" is explained below with respect to messages that are apparently missing when a wide gap exists between MRold and MRnew.

Case C, as shown in Table 1 is similar to case B in that the sequence numbers are received in the correct order, although they are not consecutive. In Case C, however, it is not apparent the numbers are in the proper order since the absolute value of the prior sequence number MRold is higher than the value of the current sequence number MRnew.

When a Case C situation arises and the variable "dn" is calculated (FIG. 4), "dn" is less than N and also less than the pseudowindow D (Boxes 405 and 409). This indicates to the processor that "dn" is the minimum distance between the two sequence numbers and the variable "dmin" is set to equal "dn", as shown in Box 410. Processor 107 then executes the sequence shown in FIG. 5 to record the missing sequence numbers and update the OUT-OF-SEQUENCE MESSAGE table.

From the above description it can be seen that in each example (Cases B and C), summing the current sequence number with the N's complement of the prior sequence number and subtracting the result from the modulus size N, where necessary to bring the result within the modulus, permitted the processor to ascertain the minimum distance between the sequence numbers and the fact that the numbers were in the proper order although not consecutive. In both cases, the processor went on to record the identity of each missing message.

In the case designated D and E shown in Table 1, it is assumed that the adjacently received sequence numbers were received in the reverse order. In order to ascertain this, however, processor 107 must go through the following sequence of operations. As with all cases, the processor sums the new sequence number MRnew with the N's complement of the last recorded sequence number MRold and finds the "dn" or "dna" variable. If the sequence numbers are in the proper order and within the distance D, "dn" or "dna" will always be smaller than the window D and the "yest" branches of Boxes 407 and 409 will be executed.

If, however, the sequence numbers are in the reverse order, the variable "dn" or "dna" will be larger than D and the "no" branch of Box 407 or 409 will be executed. The processor will now establish a new variable "dnc". The variable "dnc" is computed by taking the N's complement of either variable "dn" or "dna", as shown in Box 411 and 412, respectively. At this point the processor knows the message sequence numbers are in reverse order and continues processing in accordance with the flowchart shown in FIG. 6.

Since in each of the Cases D and E the distance between the adjacently received sequence numbers is less than the pseudowindow D, the "yes" branch of Box 600 in FIG. 6 is executed and a search is made of the OUT-OF-SEQUENCE MESSAGE table to ascertain if th new message sequence number MRnew had priorly been reported as missing. If the sequence number had not been priorly entered on the OUT-OF-SEQUENCE MESSAGE table, an error report is made and the program is exited.

Assuming that no trouble conditions exist and processor 107 finds the sequence number on the OUT-OF-SEQUENCE MESSAGE table, this entry is deleted from the table, the OUT-OF-SEQUENCE MESSAGE counter OMC is decremented, the total messages receive counter RC is incremented, and this portion of the program is exited.

In the last example, Case F shown in Table 1, the distances between the adjacently received sequence numbers exceed the pseudowindow D. This can occur as a result of several possibilities. First, if the new sequence number is behind the last sequence number, this indicates that the message identified by MRnew had been delayed in reaching the receiving processor (i.e., missing) for an exceptionally long interval. If, on the other hand, the sequence numbers are in the correct order but the distance between them exceeds the pseudowindow, the processor must ascertain if the sequence number MRnew is valid and thus record all of the missing numbers between MRold and MRnew or if MRnew is the result of a wild jump and should be marked out of order.

Processor 107 performs the same functions described above with respect to Case E in generating the variable "dnc" except when both distances "dmin" and "dmax" are greater than the pseudowindow D, variable "dnc" will also be larger than D. Thus, when the variable "dnc" is greater than D, the "no" branch of Box 600 is executed. A test is then made to determine if the distance "dnc" between the sequence numbers is greater than the modulus N indicating an error. IF it is assumed that the variable "dnc" is greater than the window D but less than the modulus N, the "no" branch of Box 605 is executed.

At this point, processor 107 examines the OUT-OF-SEQUENCE MESSAGE table (Box 607). If MRnew appears on the table as a priorly recorded missing message, the entry is deleted and the OMC and Rc counters are updated as shown in Boxes 602–604. If the sequence number MRnew is not on the OUT-OF-SEQUENCE MESSAGE table, processor 107 examines a table designated TEMP (not shown) to ascertain if there are any sequence numbers in the vicinity of MRnew.

As discussed above, under normal circumstances some messages are delayed and appear to be "missing" at the receiving processor so that a gap appears in the series of sequence numbers recorded at the receiving processor. In the example being described, these gaps should normally not exceed the pseudowindow D. In the event a processor receives a sequence number MRnew far ahead of the last number received, MRold, the processor creates a new variable designated TEMP for further observation. If the next sequence number received is within the vicinity of the variable TEMP, then the sequence number in the variable is considered valid and all missing numbers are recorded in the OUT-OF-SEQUENCE MESSAGE table as before.

On the other hand, if the next sequence number to be received is in the vicinity of the last sequence number recorded in the SEQUENCE NUMBER table, the variable TEMP is considered a "wild" jump and marked as an out-of-sequence message.

Thus, in the Case F example, MRnew has not been found on the out-of-sequence message table and the distance between MRnew and MRold is greater than the window D resulting in the "no" branch of Box 607 being executed. The processor now executes Box 609 and ascertains if there is an entry in the memory allocated for the variable TEMP. If there is no entry in the TEMP memory, MRnew is entered therein and the processor exits this portion of the program (Box 610).

If the variable TEMP had been established from a prior message, processor 107 must now ascertain if MRnew is a sequence number in close proximity to TEMP, thereby indicating that the sequence number in TEMP was a valid jump far from the previously recorded sequence number. Processor 107 must now record all missing numbers. Accordingly, when the "yes" branch of Box 611 is executed, processor 107 sets the variable "x" equal to the number of messages missing between the last sequence number MRold and the number of previously stored in the TEMP memory (Box 615). In addition, a variable "y" (Box 616) is generated representing any missing sequence numbers between the sequence number stored in TEMP and the sequence number assigned to the message currently being served and the value in TEMP is replaced by the new sequence number MRnew.

The processor then performs the operations described above with respect to FIG. 5 and enters on the OUT-OF-SEQUENCE MESSAGE table all of the missing messages.

In summary, an arrangement has been described for accounting for lost and OUT-OF-SEQUENCE MESSAGES in a multiprocessor environment. Each message is assigned a sequence number selected from a modulo numbering plan by the sending processor. The receiving processor compares the previously received sequence number with the currently received number and asertains if they are in the correct order and if any messages are missing. The sequence numbers of all missing messages are recorded for a prescribed interval of time on an OUT-OF-SEQUENCE MESSAGE table to await their arrival.

It is to be understood that the arrangements described herein are merely illustrative of the applications of the principles of the invention and that numerous other arrangements may be devised by those skilled in the art without departing from the spirit and scope of the invention.

What is claimed is:

1. A method of accounting for lost and out-of-sequence messages transmitted between processors in a multiprocessor system comprising the steps of
   appending to each message at the sending processor a sequence number selected from a modulo N series of numbers, where N is a positive integer,
   computing at the receiving processor a minimum distance between the currently received sequence number and the last received sequence number,
   ascertaining at the receiving processor whether the currently received sequence number is ahead of or behind the last received sequence number in response to said minimum distance, and
   recording in a first memory of the receiving processor all sequence numbers that are missing between the last received sequence number and the currently received sequence number when the currently received sequence number is ahead of the last received sequence number.

2. The invention set forth in claim 1 further comprising the step of deleting from said first memory the currently received sequence number when the currently received sequence number has been previously recorded in said first memory and is behind the last received sequence number.

3. The invention set forth in claim 1 or 2 wherein the step of computing the minimum distance comprises the step of summing the currently received sequence number with the N's complement of the last received sequence number.

4. The invention set forth in claim 3 wherein the step of ascertaining whether the currently received sequence number is ahead of or behind the last received sequence number comprises comparing the sum of the currently received sequence number and the N's complement of the last received sequence number with a constant D, where D is a positive integer.

5. The invention set forth in claim 4 wherein the step of recording the missing sequence numbers in said first memory is activated when the sum of the currently received sequence number and the N's complement of the last received sequence number is less than the value of D.

6. The invention set forth in claim 5 wherein the step of deleting sequence numbers from said first memory is actuated when the sum of the currently received sequence number and the N's complement of the last received sequence number exceeds the value of D.

7. A method of accounting for lost and out-of-sequence messages transmitted between processors in a multiprocessor system comprising the steps of
   appending to each message at the sending processor a sequence number selected from a modulo N series of numbers, where N is a positive integer,
   computing a minimum distance between two adjacently received sequence numbers at the receiving processor,
   ascertaining at the receiving processor which of the two adjacently received sequence numbers is ahead in response to said minimum distance,
   recording in a first memory of the receiving processor all sequence numbers missing between the two sequence numbers when the most recently received sequence number is ahead of the other received sequence number, and
   deleting from said first memory the most recently received sequence number when the most recently received sequence number has been previously recorded in said first memory and is behind the other of the two received sequence numbers.

8. The invention set forth in claim 7 wherein the step of computing the minimum distance comprises the step of summing the most recently received sequence number with the N's complement of the other received sequence number.

9. The invention set forth in claim 8 wherein the step of ascertaining which of the two adjacently received sequence numbers is ahead comprises the step of comparing said sum and the N's complement of said sum to a constant D, where D is a positive integer defining the maximum permissible distance between adjacently received messages.

10. The invention set forth in claim 9 wherein the step of recording all missing messages is activated when said sum is less than D.

11. The invention set forth in claim 10 wherein the step of deleting from said first memory is activated when said sum and the N's complement of said sum are both less than D.

12. The invention set forth in claim 11 further comprising the step of blocking the activation of recording all missing messages in said first memory when both said sum and the N's complement of said sum are greater than D and less than N.

13. The invention set forth in claim 12 wherein the step of blocking comprises the step of entering the most recently received sequence number in a second memory if the most recently received sequence number has not been priorly recorded in said first memory.

14. The invention set forth in claim 1 or 7 further comprising the step of periodically examining said first memory and deleting from said first memory those entries that have been in said first memory in excess of a prescribed interval of time.

* * * * *